June 16, 1936.                C. E. SLOOP                2,044,643
                        ELECTRICITY SERVICE METER
              Original Filed Jan. 23, 1933    2 Sheets—Sheet 1
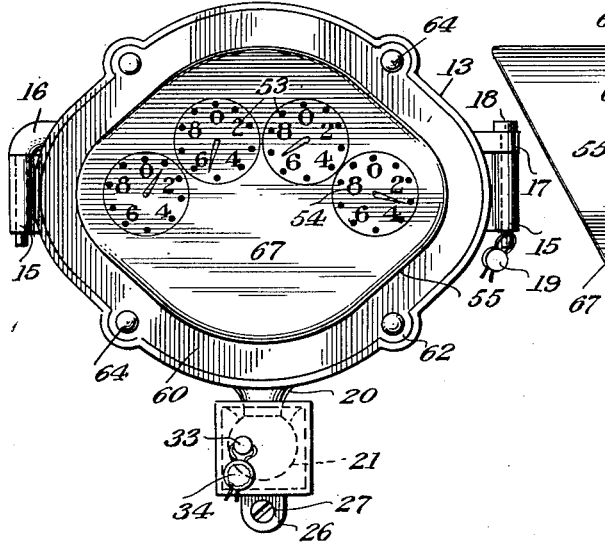
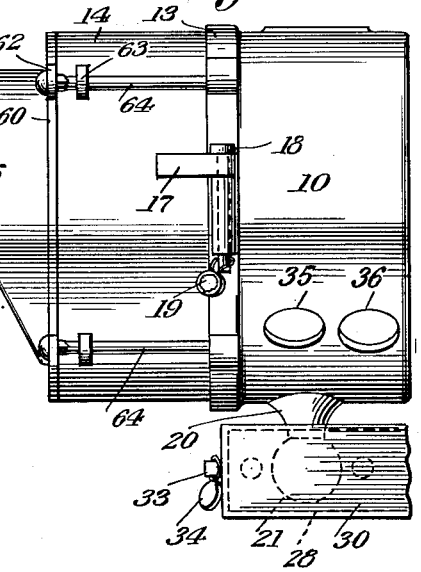
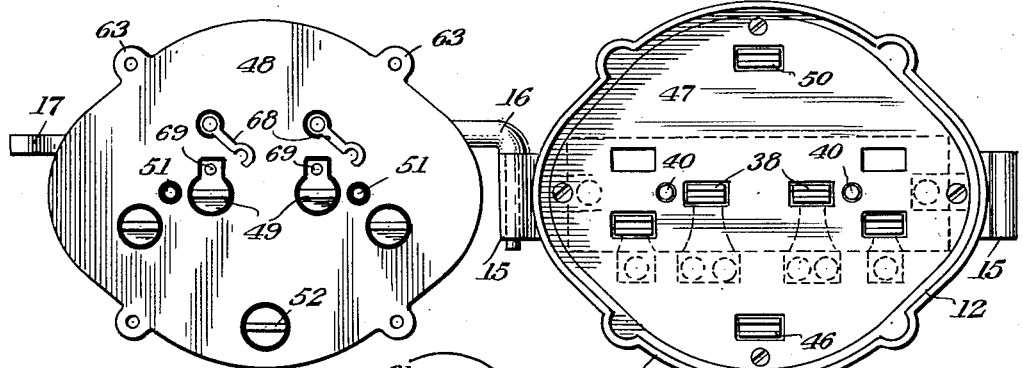
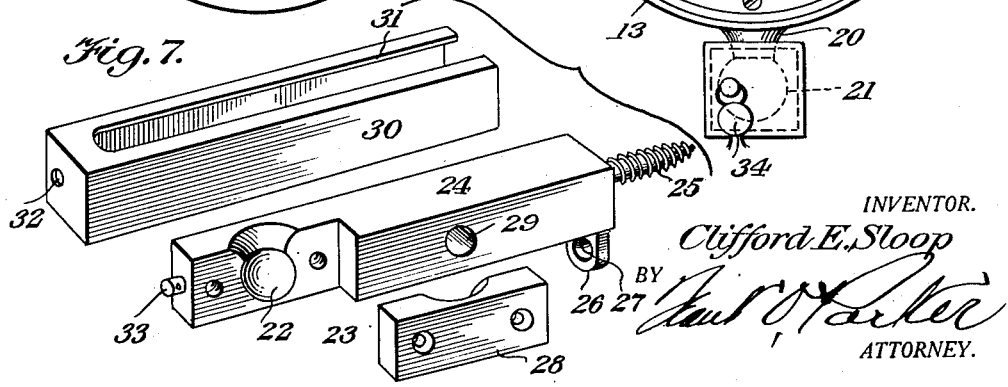
INVENTOR.
Clifford E. Sloop
BY
ATTORNEY.

June 16, 1936.  C. E. SLOOP  2,044,643
ELECTRICITY SERVICE METER
Original Filed Jan. 23, 1933  2 Sheets-Sheet 2

INVENTOR.
Clifford E. Sloop
BY
ATTORNEY.

Patented June 16, 1936

2,044,643

UNITED STATES PATENT OFFICE 2,044,643

ELECTRICITY SERVICE METER

Clifford E. Sloop, Columbus, Ga.

Application January 23, 1933, Serial No. 653,212
Renewed July 12, 1935

19 Claims. (Cl. 247—2)

The invention relates to an electricity meter, and more especially to electric service meters designed to measure kilowatt hours of electric energy delivered to customers by a distributing company.

The primary object of the invention is the provision of a meter of this character, wherein the metering of electric energy may be effected by the distributing company without requiring its customers to install any equipment other than necessary for customers' needs to accomplish their wiring problem for the service used, meter installation problems for the customers being entirely eliminated, and the meter installation problem for the distributing company being effected at a cost that is attractive and practical.

Another object of the invention is the provision of a meter of this character, wherein it is not proposed in any way to change the theory of kilowatt hour meters in general use today, but to effect a meter case and register that is applicable to the present and future needs of the distributing companies, the meter in its construction being in its entirety novel and unique.

A further object of the invention is the provision of a meter of this character, wherein an over-head mounting may be had upon a building for such meter at a service termination, and the same adjusted so that the said meter can be turned in order to allow the latter to face in either direction that it can be most easily approached from for reading as well as to enable the easy leveling of the meter.

A still further object of the invention is the provision of a meter of this character, wherein an E. M. F. connection may be had interiorly of the meter at times when the service is disconnected in order to keep the E. M. F. coil excited so that the interior of the said meter will be maintained at an even temperature during the times when the meter would be dead, thereby tending to discourage condensation, corrosion and other things that set up in the meter when its interior is cold and subject to temperature changes for a period of time.

A still further object of the invention is the provision of a meter of this character, wherein on the opening of the same all the contacts in the rear of the said meter will be dead and also when the meter starts to open from closed position a shorting strip will be pulled across the contacts at rear of a terminal board before the male contacts on the rear of meter case leave the female contacts in terminal case, thereby, not interrupting the service and all the contacts on rear of the meter are dead for testing or otherwise, and facilitates the changing of meters without changing the connections and effects such an operation very swiftly.

A still further object of the invention is the provision of a meter of this character, which is simple in its construction, thoroughly reliable and efficient in operation, strong, durable, and inexpensive to manufacture and install.

With these and other objects in view the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a front elevation of a meter constructed in accordance with the invention.

Figure 2 is a side view thereof.

Figure 3 is a front elevation showing the meter open.

Figure 7 is an exploded perspective view of the meter bracket or mounting.

Similar reference characters indicate corresponding parts throughout the several views in the drawings.

Figure 4:
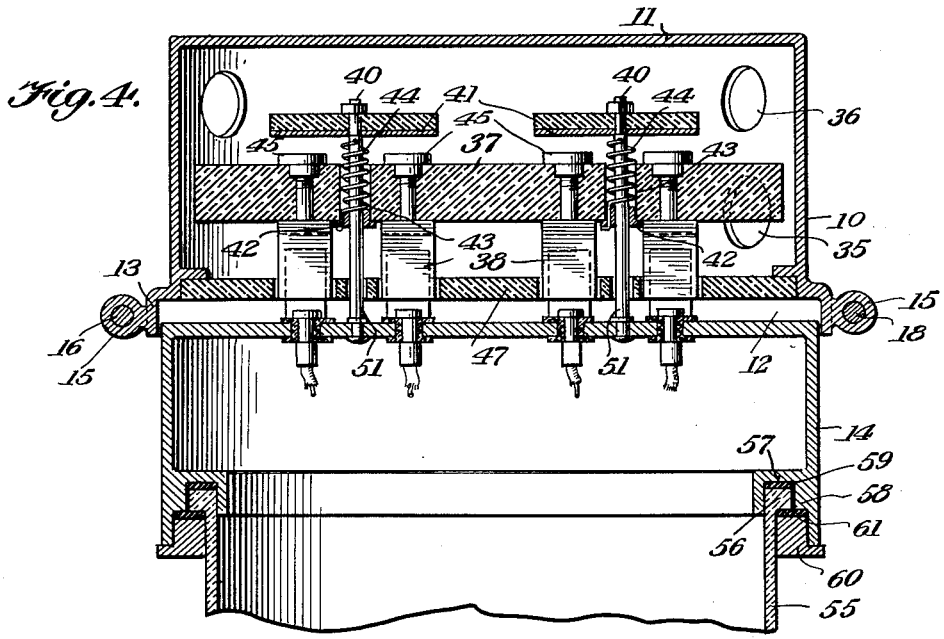
Figure 4 is an enlarged fragmentary horizontal sectional view through the meter when closed.
Figures 5, 6:
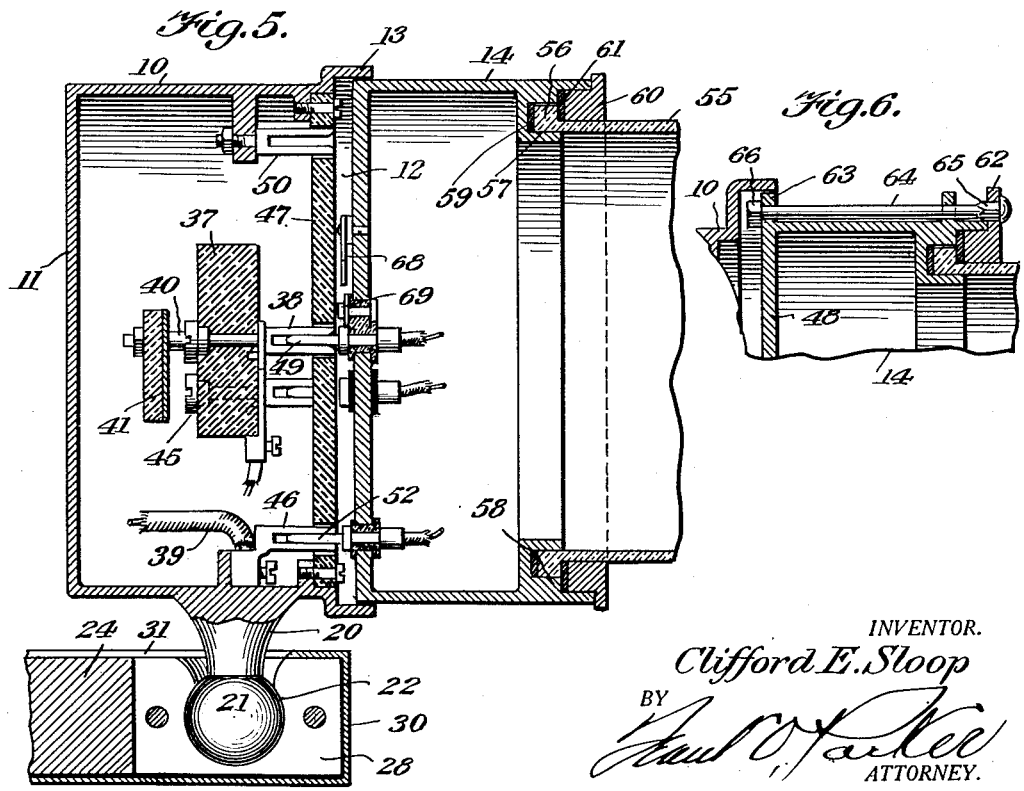
Figure 5 is a fragmentary vertical longitudinal sectional view.
Figure 6 is a detail sectional view.

Referring to the drawings in detail the electric service meter comprises a terminal case 10 which may be of any desirable shape closed at 11 at its back and open at 12 at its front. This open front 12 is provided with a continuous marginal mouth rim 13 for the interfitting with the said terminal case a meter case 14 which constitutes a door to this terminal case as will be apparent.

The terminal case at opposite sides has built thereon the vertically disposed pintle sleeves 15, these being slightly off-set laterally of the case 10, while formed on the meter case 14 at one side is a hinge pintle 16, the opposite side of the case 14 being formed with a keeper eye 17. The pintle 16 is receivable in either of the sleeves 15 upon reversing the meter case 14 as should be obvious. When the pintle 16 is engaged with one of the sleeves 15 the eye 17 will register with the other sleeve 15 for the reception of a locking pin 18 having an opening for a seal 19 when the meter case is closed onto the terminal case.

The terminal case 10 at its lowermost side has formed therewith a ball clamping stud 20, the ball 21 of which is received in a correspondingly shaped socket 22 formed in the split separable end 23 of a hanger or bracket 24. This bracket 24 is formed with a screw 25 for anchorage in walls or supports. This screw 25 can be either of the machine bolt or lag screw type. Under the bracket or hanger 24 next to the screw 25 is a heel ear 26 having an opening 27 for a fastener (not shown) to be engaged in the wall or support to prevent the said bracket or hanger from being turned when thereon. The removable section 28 of the split end 23 of the bracket 24 is secured in place in any suitable manner. Intermediate of the bracket 24 is a transverse hole 29 through which a bar, rod or tool of similar size to the hole may be put to give leverage in turning the screw 25 when the bracket or hanger is being installed. On installation of the bracket or hanger 24 and the connection of the ball stud 20 therewith a canopy shield 30 is removably fitted upon this bracket or hanger. The shield 30 has a clearance slot 31 for the stud 20 and also at its outer closed end is provided an aperture 32 for a lug 33 on the outer end 23 of the bracket or hanger 24. The lug 33 accommodates a seal 34 so that the shield 30 is made secure.

The ball stud mounting of the terminal case 10 permits the meter to turn on the bracket or hanger 24 through 360 degrees. This is in order to allow the meter to face in any direction that can be most easily approached for reading and to enable the meter to be leveled easily even though the bracket or hanger 24 may not be level. It is preferable to have the meter mounted on a building at a point of overhead service termination.

The terminal case 10 has the openings 35 and 36 for wiring, as for example to accommodate the incoming service or supply circuit, the metered circuit or outgoing circuit and an unmetered connection to be extended to a second meter (closely or remotely located) as a second meter's supply circuit. These openings may be arranged so as to work with either flexible metal covered cables, rigid conduit, or have covers suitable for an open wiring or for a flexible cloth braided weatherproof cable.

Within the terminal case 10 is a terminal board 37 of insulating material supporting female contacts 38 which are spaced the required distance apart and are dialed to said terminal board, while at 39 is a neutral or ground wire of the system. Located on the board 37 are push pins 40 carrying a short circuiting strip 41, the latter being disposed at the rear of the board 37. The pins 40 are slidable through suitable bushings 42 fitted in clearance apertures 43 in said board 37, while surrounding the pins 40 are coiled springs 44, these being connected with said pins and the bushings to exert a tension on the short circuiting strip 41 to have the same engage with the contacts 45 at the rear of board 37 when the pins 40 are freed on the opening of the meter.

At the lowermost portion of the terminal case 10 is a neutral wire terminal 46. The two center female contacts 38 on the terminal board 37 are for incoming current wires.

In front of the terminal board 37 and suitably fitted to the terminal case 10 is a guard plate 47 to prohibit exposure of live parts and contacts. The female contacts 38 go through suitable openings in this guard plate 47 and terminate flush with the outer face thereof. This plate may be made from metal with suitable insulating bushings around all live parts or the said plate may be made from insulating material thereby eliminating the need for bushings.

Arranged at the back 48 of the meter case 14 are the male contacts 49 these being extended through suitable insulating bushings. These contacts are for a single phase, three wire meter. However, for a two wire, single phase meter only two contacts would be used at the center of the meter for in and out leads to the current coil of the same and at the bottom of the case 14 would be a third contact for an E. M. F. connection to the grounded or neutral wire terminal in the bottom of terminal case 10.

At the top of the terminal case 10 is a female contact 50, this being grounded to the said case 10 and thus connected to the neutral or ground wire 39.

The female contacts 38 centrally of the terminal case 10 are in a position to receive the male contacts 49 corresponding thereto on the rear of the meter case 14 at all times whether the meter is upside down or not, thereby keeping the E. M. F. coil of the meter energized regardless of the position of meter when closed, and therefore when the meter is disconnected and its case has been attached to the terminal case 10 in upside-down position the E. M. F. coil will be excited while service is off. This will maintain the interior of the meter at an even temperature during times when the meter would ordinarily be dead and the heat given from the E. M. F. coil will tend to discourage condensation, corrosion and other things that set up in the meter when its interior is cold and subject to temperature changes for a period of time.

Located on the back of the meter case 14 are the abutment pins 51 which are adapted to align with the pins 40 when the meter case 14 is closed onto the terminal case 10 so as to push said pins 40 to displace the shorting strip 41 off of the contacts 45 at the rear of the terminal board 37.

At the back of meter case is the male E. M. F. contact 52 for reception in either contact 46 or 50, respectively accordingly to the change of the position of the meter case 14 as should be obvious.

The meter case 14 houses the registering mechanism (not shown) excepting the register dials 53, these being at the front of said meter case and bear even numerals 54 as the odd numerals have been omitted in order to permit larger numbers to be used and not have the register dials so crowded with figures as would be confusing to read at a distance.

Carried at the front of the meter case 14 is a glass covering or hood 55 having a laterally flanged outturned inner end edge 56 which is received in a seating channel 57 of an internal shoulder 58 in the case 14. A gasket 59 is in the channel 57 against which rests the edge 56. This shoulder 58 also forms a seat for a binding ring 60 surrounding the covering or hood 55, there being a gasket 61 at the seat for the ring 60. The back 48 of the case 14 and the ring 60 are both formed with bolt bearings 62 and 63, respectively, in which are engaged the bolts 64. These bolts 64 have square shoulders 65 under their heads to prevent their being turned and their nuts being slackened off, the nuts 66 for the bolts being concealed by the terminal case 10 when the meter case 14 is interfitted therewith.

When the bolts 64 are tightened and bind the ring 60 against the gasket 61 and the case 14 and the covering or hood 55, that pressure is also against the gasket 59 between said covering or hood and case 14. In this way any moisture that might pass the gasket 61 would never pass gasket 59. The two gaskets, the shoulder on the case 14 and the flange on the covering or hood should be of proper dimensions, so as to limit pressure on the covering or hood to a fixed amount which would be sufficient for moisture proof purposes and at the same time not allow the covering or hood to be under sufficient strain to be broken or cracked. To satisfy this the binding ring 60 could be allowed to go against the shoulder 58 when sufficient pressure is had. The limiting of pressure on the covering or hood 55 is important as many glass coverings or hoods are broken when pressure is excessive or when under excessive strain, by contraction and expansion and the strain itself.

The reading face 67 of the covering or hood 55 is at an angle to the meter casing 14 for convenience in reading the meter from the ground as the latter is designed for use at a point of overhead service termination.

As has been stated the meter case 14 itself acts as a door to the terminal case 10. This meter case 14 turns on the hinge pintle 16 fast to the same, the latter fitting in the sleeve 15 at the left hand side of the terminal case, the other sleeve 15 at the right hand side of the case 10, being of same dimensions as the left hand one, enables the meter case 14 to be turned upside down when electric service is discontinued. When the meter case 14 is sealed in an upside down position, as well as when it is sealed in an upright position, this being the working position, the said case goes into the terminal case 10 a sufficient distance to prevent any side motion and the sealing prevents the meter case 14 from being opened out.

With the close fitting hinge feature no strain or weight from meter case 14 will rest on the female contacts in the terminal case 10.

On swinging the meter case 14 open all contacts on the rear of same are dead. Also when the meter case starts to open from closed position in the terminal case 10 the springs 44 acting on the pins 40 pull shorting strips 41 across the contacts 45 at the rear of the board 37 thereby not interrupting the service and all contacts on back of the meter case 14 are dead for testing or otherwise. This method facilitates the changing of the meters without changing the connections and effects such operation very swiftly. If a two wire meter should be inserted into the terminal case 10 only two wire service could be had without changing any connections, as the two wire meter case 14 would only have two male contacts on its back. Therefore, if the terminal case 10 is wired for three wire service, the kind of service had by the customer is determined by the kind of meter installed, (two wire meter or three wire meter). This feature would eliminate all possibility of metering errors caused by incorrect wiring connections, such as installing a two wire meter when the three wire service was used, which case is often found to be true in the field due to inexperienced employees making meter installations.

It should be apparent that when the meter case 14 starts to close into the terminal case 10, the male contacts at the back 48 of said case mate with the female contacts on the board 37 and as the male contacts go deeper into the female contacts, the pins 51 force the pins 40, which project through said board, further back against the tension of the springs 44 until the shorting strips 41 are removed from across terminals 45 at, rear of, female contacts, allowing current to flow through the current coil of the meter.

The back 48 of the meter case 14 has the link connections 68 to the E. M. F. coil, while the male contacts 49 have the screws 69 for engagement by said links 68, the latter being disengaged from said screws as shown in Figure 3 of the drawings.

What is claimed is:

1. In an electricity meter, a terminal case, a meter case, means reversely hinging the meter case for swinging movement on the terminal case, and means for sealing such means when the meter case is in normal or reverse positions.

2. In an electricity meter, a terminal case, a meter case, means reversely hinging the meter case on the terminal case for swinging movement, means for sealing such means when the meter case is in normal or reverse position, and means for supporting the terminal case to permit adjustment thereof for turning approximately three hundred and sixty degrees.

3. In an electricity meter, a terminal case, a meter case, means reversely hinging the meter case on the terminal case for swinging movement, means for sealing such means when the meter case is in normal or reverse position, means for supporting the terminal case to permit adjustment thereof for turning approximately three hundred and sixty degrees, and means for sealing the connection between the support and terminal case.

4. In an electricity meter, a terminal case, a meter case, means reversely hinging the meter case on the terminal case for swinging movement, means for sealing such means when the meter case is in normal or reverse position, means for supporting the terminal case to permit rotation thereof approximately three hundred and sixty degrees, means for sealing the connection between the support and terminal case, and male and female contacts on the meeting sides of the meter and terminal cases mated to each other.

5. In an electricity meter, a terminal case, a meter case, means reversely hinging the meter case on the terminal case for swinging movement, means for sealing such means when the meter case is in normal or reverse position, means for supporting the terminal case to permit rotation thereof approximately three hundred and sixty degrees, means for sealing the connection between the support and terminal case, male and female contacts on the meeting sides of the meter and terminal cases mated to each other, and a short circuiting device for the female contacts arranged in the terminal case and automatically engaging said contacts on separation of the cases and disengaging such contacts when the cases are brought together.

6. In an electricity meter, a terminal case, a meter case, means reversely hinging the meter case on the terminal case for swinging movement, means for sealing such means when the meter case is in normal or reverse position, means for supporting the terminal case to permit rotation thereof approximately three hundred and sixty degrees, means for sealing the connection between the support and terminal case, male and female contacts on the meeting sides of the meter and terminal cases, a short circuiting device for the female contacts arranged in the terminal case and automatically engaging said contacts when the cases are separated and disengaging such contacts when the cases are brought together, a glass hood on the front of the meter case, and voltage coil contacts on the cases and engageable with each other when reversely hinging the meter case from normalcy on the terminal case.

7. In an electricity meter, a terminal case, a meter case, electric connectors at confronting portions of said cases and releasably interfitting each other on the bringing together of the cases, and a circuit closer operative within the cases and rendered inactive when said cases are together and active on the separation of the latter.

8. In an electricity meter, a terminal case, a meter case, electric connectors at confronting portions of said cases and releasably interfitting each other on the bringing together of the cases, means for detachably sealing the cases with each other, a circuit closer operative within the cases and rendered inactive when said cases are together and active on the separation of the latter, and a switch confined by the cases and opened when the meter case is reversed from normal metering position and engaged with the terminal case.

9. In an electricity meter, a terminal case, a meter case, electric connectors at confronting portions of said cases and releasably interfitting each other on the bringing together of the cases, means for detachably sealing the cases with each other, a circuit closer operative within the cases and rendered inactive when said cases are together and active on the separation of the latter, and a switch confined by the cases and opened when the meter case is reversed from normal metering position and engaged with the terminal case and also providing warming condition within the meter case by current from a power line without metering activity of said meter.

10. In an electricity service meter, a terminal case, a meter case, electric connectors at confronting portions of said cases and releasably interfitting each other, on bringing together of the said cases, means for reversely mounting one case upon the other, and means for detachably sealing the cases to each other.

11. In an electricity service meter, a terminal case, a reversible meter case, separable means on the respective cases for reversibly hinging the same together, and means for holding and sealing these cases in both positions.

12. In a metering device, a terminal case having input and output connections, a meter case having a metering mechanism fitted upon the terminal case, corresponding input and output connections carried by said meter case, means for detachably connecting said meter case on the terminal case with the connections of the meter case engaging respectively the corresponding connections of the terminal case, means confined within the latter and controlled by said meter case for connecting the input connections directly with the output connections in the terminal case upon detachment of said meter case from the said terminal case.

13. In electricity service, a metering mechanism for detachable connection with a power line and having an abutment, and means coacting between said abutment and the power line for closing of the latter to a load line on disconnecting the metering mechanism from said power line.

14. In an electricity service meter having power line and load connections and service and E. M. F. coils, respectively, a support for a meter having corresponding line and load connections for engaging the first mentioned connections, and means for connecting the E. M. F. coil to the line connection when the load connection is disconnected from the line connection.

15. In an electricity service meter having means interiorly thereof for E. M. F. connection with a power line when the latter is cut off from the meter to maintain said meter at an even temperature for warming while it is inactive.

16. The combination of an electrical power line and an electrical load, an electrical metering device, means for effecting connection of said load to the power line through the electrical metering device, and means coacting with the power line at the point of the first named means for connecting said load to said power line without disruption of the load upon disconnecting said metering device.

17. In an electric power line, a meter case support having power line and load connections, a meter case having separable connection with the support and supporting metering mechanism provided with cooperating connections for electrically engaging the first mentioned connections when the meter case is attached to the support, and means effecting connection of the load connections with the line connections when the meter case is removed from the support.

18. In an electricity service meter, a terminal case, two and three wire power line connectors located in said case for coupling with correspondingly arranged connectors of the service meter and means coacting with the connectors of the power line for preventing a disruption of an electrical load at the terminal case on disconnecting the meter connectors from the power line connectors.

19. In an electricity service meter, a terminal case for a power line, a meter case having metering mechanism, electric connections at confronting portions of said cases when together and releasably interfitting each other on bringing together of said cases for metering operation, and a circuit closer operative between the cases and effective for rendering load service from the power line when separating the electrical connections on removal of the meter case from the terminal case.

CLIFFORD E. SLOOP.